July 6, 1948.

G. L. JOHNSON ET AL 2,444,650

PROCESS FOR CRACKING HYDROCARBONS
AND APPARATUS THEREFOR

Filed April 4, 1946

GEORGE L. JOHNSON
WILLIAM A. HAGERBAUMER
INVENTORS

BY *Oswald G. Hayes*

ATTORNEY

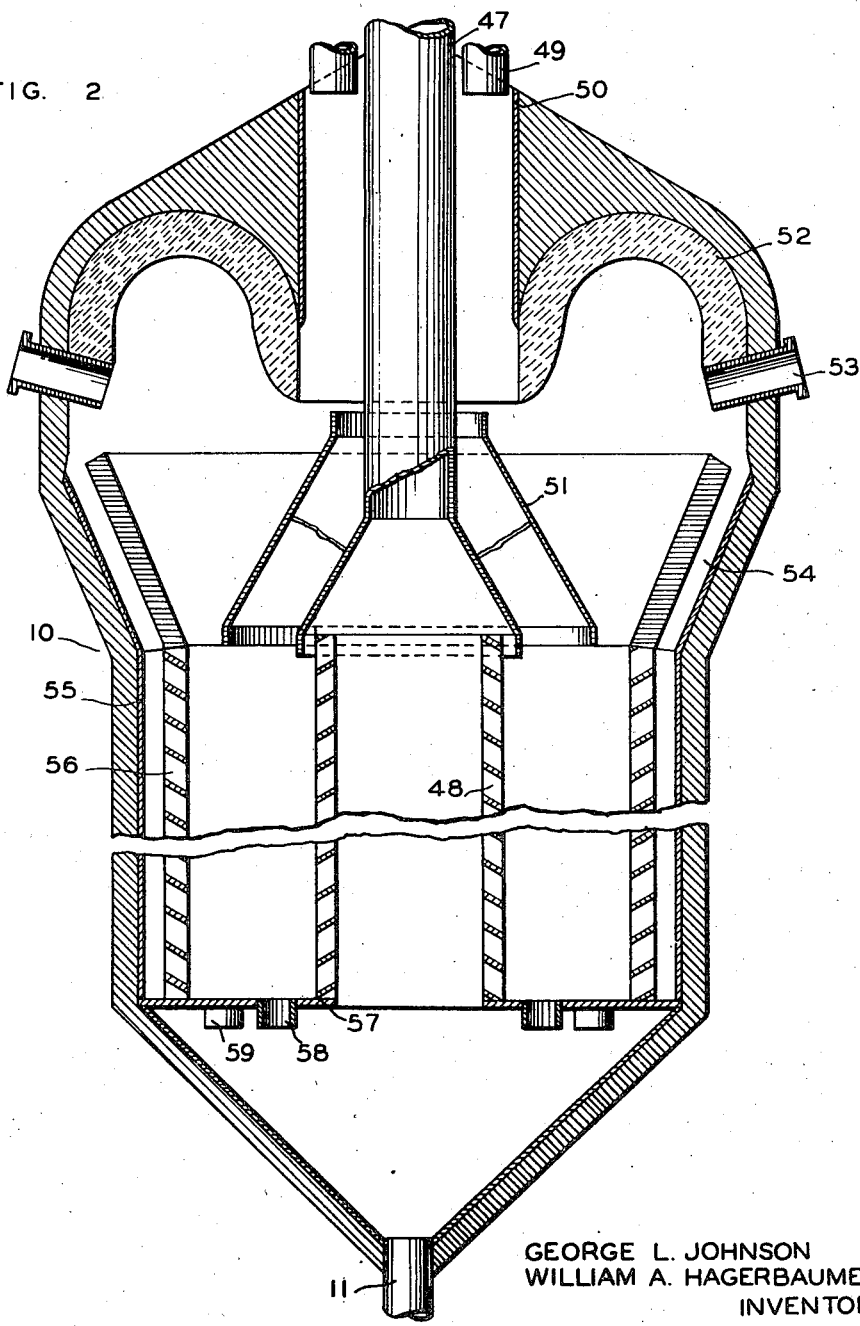

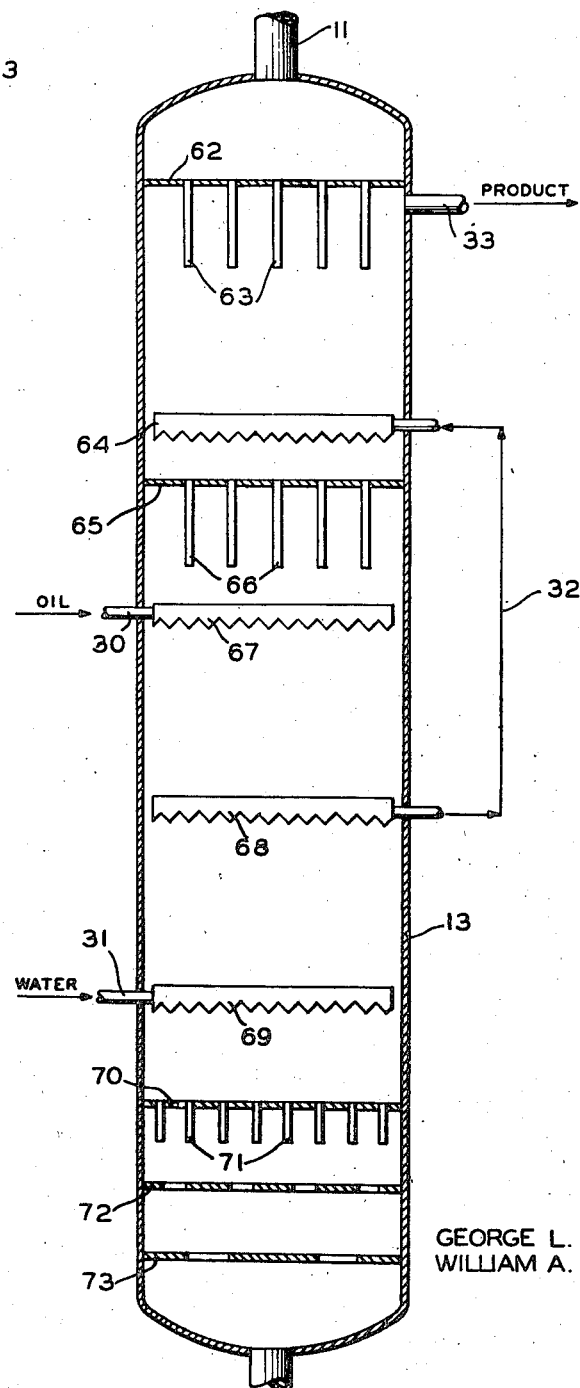

Patented July 6, 1948

2,444,650

UNITED STATES PATENT OFFICE 2,444,650

PROCESS FOR CRACKING HYDROCARBONS AND APPARATUS THEREFOR

George L. Johnson, New York, N. Y., and William A. Hagerbaumer, Westfield, N. J., assignors to Socony-Vacuum Oil Company, Incorporated, a corporation of New York Application April 4, 1946, Serial No. 659,443

3 Claims. (Cl. 196—55)

This invention relates to a process for treating a gas with a hot solid to induce a desired reaction and promptly reducing the temperature of the gas to stop the reaction after a suitable short reaction period.

The invention provides two separate cycles of solid material for successive contact with the gaseous reaction mixture. In the first cycle, granular solids are passed through a heater in which they are raised to a suitable high temperature and are then transferred to a contacting zone wherein the charge fluid is passed in direct contact with the solids to raise the reactant fluid to the desired elevated temperature. Upon passage of a suitable short reaction period, which may be less than a second, the reactant mixture is transferred to direct contact with cold granular solids in the second cycle to quench the reactants and halt the reaction. Solids in the second cycle are raised in temperature by contact with the reactants and are then transferred to a cooling zone wherein the temperature is reduced and the cooled solids are returned to the quencher. In general, the two zones in each cycle may be placed one above the other to flow downward through the two zones and then be returned to the upper zone by an elevator for again passing through the cycles. In the embodiment here shown separate elevators are used for the two separate cycles but it is to be understood that the same granular solid may be used in the two cycles and returned to the top by means of a common elevator whereupon the stream of solids is split in the portions desired for the two cycles.

In the reaction cycle, i. e. the cycle in which fluid reactants are heated by contact with a hot granular solid, the heating zone is advantageously a region for direct contact between hot products of combustion and the granular solid. This invention provides major operating economies by utilizing air to cool the granular solid in the quenching cycle and then using the so-heated air to generate the products of combustion desired for heating the granular solid in the reaction cycle.

The invention is particularly well adapted to a process for the thermal conversion of hydrocarbons at high reaction temperatures and short contact times by use of the system generally discussed above. Thus, large yields of ethylene may be manufactured by thermally cracking hydrocarbon fractions such as gas oils, topped crudes and the like at temperatures on the order of 1400 to 1600° F. and reaction times of one-half second or less. The reaction time must be held to a relatively short period since secondary reactions, principally condensation reactions, set in at these temperatures to produce by-products. The initial by-products are aromatic compounds but further condensation results in highly condensed ring compounds in the nature of tars and cokes. In such hydrocarbon cracking processes a solid quench medium is advantageous in that heavy compounds are deposited on a solid from which they are readily removed by burning and do not contaminate by-products which may be put to valuable uses. In the preferred embodiment of the invention wherein hydrocarbons are cracked thermally by contact with a hot granular solid and quenched by a relatively cooler granular solid, thus depositing carbonaceous material on the quenching solid, further advantages are obtained. The solid in the quench cycle is transferred to the cooling zone of that cycle at relatively high temperature. Air admitted to the cooling zone burns off the carbonaceous deposits thus further preheating the air later supplied to the burners for the reaction cycle and cleansing the solid in the quench cycle.

Additional objects and advantages of the invention will become apparent from consideration of a typical embodiment thereof, apparatus for that embodiment being illustrated in the annexed drawings, wherein:

Figure 2 is a vertical section through one type of heater for the reaction cycle and Figure 3 is a vertical section through the contactor in the reaction cycle.

Figure 1:
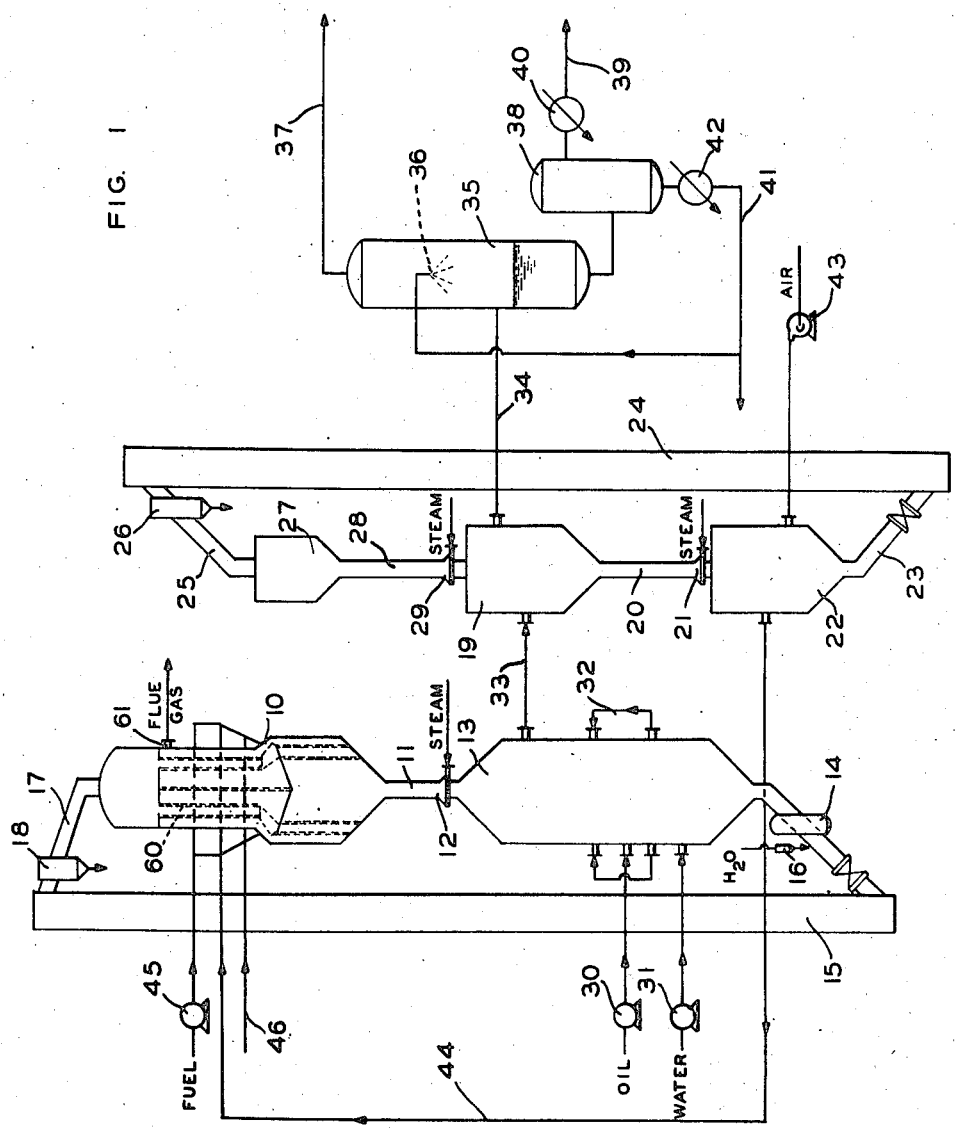
Figure 1 is a diagrammatic showing of a typical plant for practicing the invention.

Referring specifically to Figure 1, the embodiment shown utilizes two separate circulating systems for granular solid. In the reaction cycle, the solid is heated in a heater 10 and passed downwardly at high temperature through a feed leg 11 having a steam sealing zone 12 to a reactor 13. In the reactor 13 hydrocarbon reactants are passed in direct contact with the hot solid in a manner to be described in detail hereinafter. Spent solids from the reactor 13 pass through a purging pot 14 to an elevator 15. The purging pot may advantageously be an enlarged zone held under slight vacuum by an injector 16. The granular solids from reactor 13 are transferred in elevator 15, for example at about 900° F., to a feed chute 17 having a classifier 18 for removal of small particles.

In the quenching cycle, reaction mixture from reactor 13 enters a quench chamber 19 wherein it is contacted with relatively cold granular solids to reduce the temperature to a level below that at which reaction occurs. This results in heating the granular solid and depositing thereon a combustible contaminant. The hot contaminated solid passes by a feed leg 20 having a steam sealing zone 21 to a cooler 22 wherein the granular solid is contacted with air or other suitable cooling medium; the cold solid passing by line 23 to elevator 24 from the top of which it enters chute 25 having a classifier 26 and passes to a feed hopper 27. The cold solids from feed hopper 27 pass downwardly by feed leg 28 equipped with a steam sealing zone 29 to enter the quencher 19.

In the reaction specifically discussed herein as exemplary, it is desirable to have a quantity of steam mixed with the hydrocarbons during reaction. According to one embodiment of the invention, oil vapors are generated by injecting liquid oil from pump 30 directly into the bed of hot solids in reactor 13 and injecting liquid water from pump 31 to a lower point in the reactor for generation of steam. The oil and water vapors are mixed within reactor 13 and transferred by lines 32 to a higher point in the reactor wherein the mixed vapors contact granular solid at its higher temperature and undergo reaction. The reaction products are promptly transferred by line 33 to quench chamber 19 wherein their temperature drops below that at which reaction will take place and the cooled vapors pass by line 34 to a spray condenser 35 wherein a spray of cold liquid from spray head 36 lowers the temperature to such an extent that light hydrocarbon gases are separated from heavier hydrocarbons and pass overhead by line 37 to suitable fractionation and purification equipment. The liquid mixture of oil and water in the bottom of spray condenser 35 is transferred to a settler 38 wherein water and oil are separated, the latter being transferred by line 39 through cooler 40 to storage or means for separation of valuable constituents thereof. The water layer from the bottom of settler 38 is removed by line 41 through cooler 42 and may be recycled in part to the spray head 36. A portion of the water from the bottom of settler 38 may be used for the generation of steam in reactor 13 since the system of steam generation used therein is fully capable of utilizing dirty water for generation of clean steam. Any contaminants in the water are deposited on the solid for later removal in the heater 10 by burning.

As noted above, air is passed through the cooling zone 22 wherein it is preheated and later used for generation of hot products of combustion for heating of the granular solid in heater 10. Air for this purpose is supplied by compressor 43 and is heated in cooler 22 from which it is passed by line 44 to burners in heater 10. As shown, fuel, for example hydrocarbon gases, may be supplied to the heater 10 by compressor 45. When utilizing a liquid fuel such as a heavy petroleum fraction, atomizing steam for the burners can be supplied to the heater 10 by line 46.

A typical structure for the heater 10 is shown in Figure 2 wherein the burners and gas-solid contact means are arranged around a central flue including the chimney 47 and a louvered wall 48, the purpose of which will be brought out below. Granular solids are admitted to the heater by a feed pipe 49 from which they pass downward through an annular space between the chimney 47 and a side wall 50. In this annular space indirect heat exchange between hot gases and the incoming solid takes place to aid in heating the granular solid. The preheated solid then meets a dividing cone 51 which splits the solid stream to an inner portion lying against the diverging bottom of chimney 47 and an outer portion which is exposed at its surface to a combustion chamber enclosed by a refractory arch 52.

Disposed below the arch 52 are a plurality of ports 53 to receive burners for generation of a flame impinging directly upon the granular solids lying against the conical divider 51. The hot products of combustion are transferred by a passage indicated generally at 54 to an annular space between the outer wall 55 of the heater and a second louvered wall 56 which defines a passage for the granular solids between the walls 48 and 56. The hot products of combustion pass transversely through the downwardly moving solids to enter the central flue below chimney 47 from which they are removed by the said chimney 47 to economizers or the like. To insure even flow of the granular solids between walls 48 and 56, there is provided a plate 57 across the bottom of the granular solid passage pierced by two rings of tubes 58 and 59. The tubes 59 in the outer ring are staggered with respect to the rings 58 in the inner ring thus providing a plurality of withdrawal points spaced a short distance apart to minimize the small heap of non-flowing or slowly moving solids therebetween. Hot solids pass from pipes 58 and 59 downward to the feed leg 11 from which they are transferred to the reactor 13 as previously noted.

A slightly different modification of the heater 10 is indicated in Figure 1 wherein the central flue is defined by louvered walls below the burner as in Figure 2 and is also defined by similar louvered walls above the burner as indicated at 60. In this case the hot products of combustion from the lower heat transfer region pass to an upper heat transfer region above the burners, flow outwardly through solids between louvered walls and are removed by a port 61.

The reactor, illustrated by Figure 3, is of relatively simple structure but accomplishes the several functions of vaporizing oil and water, mixing the vapors and contacting the vapor mixture with highly heated solids. Solids admitted from feed leg 11 fall onto a tube sheet 62 from which a number of feed pipes 63 depend. The solids move downwardly as a compact bed below the feed pipes 63 past a plurality of vapor distributors 64 to a second tube sheet 65 which again has feed pipes 66 depending therefrom. The granular solids again move down as a compact bed past distributors 67, vapor collectors 68 and distributors 69 to a plate 70 having a plurality of withdrawal tubes 71 similar in function to tubes 58 and 59 shown in Figure 2. Plate 72 has a lesser number of openings than does plate 70 to equalize withdrawal from the several pipes 71 and plate 73 has a still lesser number of openings for the same reason.

As the hot solids move downward through the reactor 13 they are gradually cooled but sufficient heat is retained to adequately vaporize the oil charge and the water admitted for generation of steam. The single vessel thus generates oil vapors from liquid admitted by line 30 and distributors 67 and generates steam from liquid water admitted by line 31 and distributor 69. The oil vapors move downwardly, since the pipes 66 constitute a seal of reasonable efficiency, and mingle with steam at collector 68 to form a mixture of hydrocarbon vapors and water vapor which is transferred by line 32 and distributors 64 to the upper part of the chamber. This reaction mixture passes upwardly countercurrent to the very hot solids in the top of the reactor and is thus rapidly heated to the desired reaction temperature and passes into the space among tubes 63 which is free of solids, from which it is withdrawn by pipe 33 and transferred as described to quenching chamber 19 to be rapidly cooled to a temperature below that at which reaction occurs.

A high yield of ethylene is produced at a mean effective temperature of 1454° F. and 0.40 second reaction time using 51.3% of steam by weight based on total charge. The granular solid used was particles of fused alumina at a maximum temperature during contact of about 1560° F. A granular solid to oil ratio of 11.9 (based on weight) was employed at a space velocity of 2.03 liquid volumes of gas oil at 60° F. per volume of reaction space per hour, calculating reaction space as that portion of the reactor wherein the charge is finally heated to reaction temperature and excluding vaporizing and preheating zones. This operation produces 27.7% by weight of ethylene together with substantial amounts of other olefins including butadiene, butene, propylenes, etc. The process also yields 7.5% of highly aromatic gasoline.

We claim:

1. A process for conducting a high temperature cracking treatment of a fluid hydrocarbon for a predetermined period of time which comprises moving a solid granular heating agent in a cyclic manner through a heating zone and a first contacting zone below said heating zone, moving a solid granular cooling agent in a cyclic manner through a cooling zone and a second contacting zone above said cooling zone, burning fuel in heated air to generate high temperature products of combustion, contacting said products of combustion with said heating agent to raise the temperature thereof in said heating zone to a temperature above the desired cracking temperature, transferring the high temperature heating agent directly downward to said first contacting zone, passing said hydrocarbon in direct contact with said high temperature heating agent in said first contacting zone to thereby heat said hydrocarbon to said cracking temperature, transferring hydrocarbon products of such heating to said second contacting zone and therein passing said hydrocarbon products in direct contact with said cooling agent to thereby quench said hydrocarbon products to a low temperature at which heavy components thereof are condensed thus raising the temperature of said cooling agent and depositing carbonaceous material thereon, transferring the heated cooling agent to said cooling zone, passing an excess of air in direct contact with said cooling agent in said cooling zone to burn off said carbonaceous material and to lower the temperature of said cooling agent not substantially greater than said low temperature and heat said air, and transferring the heated air to said fuel burning step for generation of high temperature products of combustion as aforesaid.

2. A process for conducting a high temperature cracking treatment of a fluid hydrocarbon for a predetermined period of time which comprises moving a solid granular heating agent in a cyclic manner through a heating zone and a first contacting zone, moving a solid granular cooling agent, in a cyclic manner through a cooling zone and a second contacting zone, burning fuel in heated air to generate high temperature products of combustion, contacting said products of combustion with said heating agent to raise the temperature thereof in said heating zone to a temperature above the desired cracking temperature, transferring the high temperature heating agent to said first contacting zone, passing said hydrocarbon in direct contact with said high temperature heating agent in said first contacting zone to thereby heat said hydrocarbon to said cracking temperature, transferring hydrocarbon products of such heating to said second contacting zone and therein passing said hydrocarbon products in direct contact with said cooling agent to thereby quench said hydrocarbon products to a low temperature at which heavy components thereof are condensed thus raising the temperature of said cooling agent and depositing carbonaceous material thereon, transferring the heated cooling agent to said cooling zone, passing an excess of air in direct contact with said cooling agent in said cooling zone to burn off said carbonaceous material and to lower the temperature of said cooling agent not substantially greater than said low temperature and heat said air, and transferring the heated air to said fuel burning step for generation of high temperature products of combustion as aforesaid.

3. Apparatus for thermal conversion of hydrocarbons by rapid heating thereof in contact with a hot granular solid followed by rapid cooling in contact with a cool granular solid comprising a heating chamber and a first contacting chamber each adapted for downward movement of a compact bed of granular solid therethrough, means for transferring granular solid from the bottom of said heating chamber to the top of said first contacting chamber and from the bottom of said first contacting chamber to the top of said heating chamber, a cooling chamber and a second contacting chamber each adapted for downward movement of a compact bed of granular solid therethrough, means for transferring granular solid from the bottom of said cooling chamber to the top of said second contacting chamber and from the bottom of said second contact chamber to the top of said cooling chamber, means to pass a fluid in contact with the granular solid in said first contacting chamber, means to transfer said fluid from said first contacting chamber to said second contacting chamber, means to flow air through granular solid in said cooling chamber, a burner, means to supply air heated by contact with said solid in said cooling chamber for combustion of fuel in said burner, and means to pass products of combustion from said burner through granular solid in said heating chamber.

GEORGE L. JOHNSON.
WILLIAM A. HAGERBAUMER.

REFERENCES CITED

The following references are of record in the file of this patent:

UNITED STATES PATENTS

| Number | Name | Date |
|---|---|---|
| 2,376,191 | Roetheli et al. | May 15, 1945 |
| 2,389,636 | Ramseyer (A) | Nov. 27, 1945 |
| 2,396,709 | Leffer | Mar. 19, 1946 |
| 2,399,450 | Ramseyer (B) | Apr. 30, 1946 |